United States Patent Office 2,852,386
Patented Sept. 16, 1958

2,852,386

HYDROPHILIC COMPOSITIONS

Lee K. J. Tong, Rochester, N. Y., assignor to Eastman Kodak Company, Rochester, N. Y., a corporation of New Jersey No Drawing. Application September 24, 1952
Serial No. 311,319

9 Claims. (Cl. 96—114)

My invention relates to hydrophilic compositions comprising a naturally-occurring hydrophilic colloid and a latex which imparts flexibility or other advantageous properties thereto.

Hydrophilic colloids are known to be useful in many connections, particularly those of a photographic nature, due to the optical clarity of attenuated products which may be prepared therefrom. Gelatin, for example, is typical of the hydrophilic colloids, particularly of the protein type, which have been found to be useful in this connection. As a general rule, photographic emulsions, at the present time, employ gelatin as the colloidal material therein.

One of the principal objections to gelatin and other like colloids is the property which they have of exhibiting brittleness when coated out from aqueous solution in the form of a layer of substantial thickness. Various attempts have been made to improve the flexibility of gelatin and like colloids, by adding to the coating materials thereof suspensions of elastic material. On the whole, these attempts to improve the flexibility of the gelatin have been unsatisfactory because of optical and mechanical incompatibility, resulting in haziness of the final film, or coagulation of the suspension before the gelatin film has dried. For instance, addition of water-soluble polymers to gelatin or the like has, on the whole, been unsatisfactory, as these polymers, as a rule, are either incompatible with gelatin in some stage in which the gelatin is employed or are brittle.

One object of my invention is to provide gelatin compositions which are adapted to provide layers thereof improved in flexibility or other properties over the layers which are obtained by using only gelatin. Another object of my invention is to provide gelatin compositions which, when coated out and dried, experience no loss of optical properties. A further object of my invention is to provide gelatin compositions giving coatings having flexibilities superior to those of gelatin coatings, but having substantially the same refractive index as gelatin itself. A still further object of my invention is to improve gelatin by mixing therewith an aqueous dispersion resulting from the dispersion polymerization of a mixture of the amide of an acid of the acrylic acid series, an acrylic acid ester and a monomer of the unsaturated aromatic type. Other objects of my invention will appear herein.

I have found that the hydrosols prepared by the emulsion polymerization of a mixture of an amide of an acid of the acrylic acid series, an acrylic acid ester and an unsaturated aromatic compound of the styrene type can be mixed with hydrophilic colloids, such as gelatin, in all proportions, particularly in the range of 10% to 90%, and that no coagulation will occur in any stage of the use of the resulting composition for coatings, and the coatings so obtained will have superior flexibility and optical clarity. In addition, the tensile strength of the gelatin or other colloidal material is maintained, even though a fairly high percentage of the hydrosol is used with the hydrophilic colloid in such compositions.

The hydrosols, or latices, employed in preparing compositions, in accordance with my invention, are those which are prepared by an emulsion polymerization of an unsaturated aliphatic amide, such as acrylamide, N-methacrylamide, N-ethylacrylamide and the like, with an acrylic acid ester, such as methyl acrylate, butyl acrylate, methyl methacrylate, ethyl methacrylate or the like, and an unsaturated benzenoid compound of the styrene type, such as styrene, o-chlorostyrene, p-methylstyrene or the like. The hydrosols which are useful in my invention, their preparation and the various monomers which may be polymerized together while in dispersion to form those hydrosols are described in Patent No. 2,739,137 of William F. Fowler, Jr., entitled "A Method for Making Polymeric Hydrosols," filed February 20, 1952. The hydrosols prepared in accordance with the descriptions given in Patent No. 2,739,137 may be directly mixed with dispersions of gelatin or other hydrophilic colloids to form compositions in accordance with my invention. The hydrosols of the type described in Patent No. 2,739,137, when employed in gelatin photographic emulsions, result in emulsions which give coatings of good flexibility, even in the form of layers having substantial thickness. The compositions of hydrosol and hydrophilic colloid, according to my invention, have various uses, such as binders for baryta coatings, for sizing paper, for pelloid coatings and the like. Dyes may be incorporated in these compositions in sufficient amount to give the desired coloration, and those compositions may be employed for antihalation backing for film, or in making color filters.

Although my invention is particularly directed to compositions of gelatin and hydrosols of the type referred to, my invention is not confined thereto, but relates to the improvement generally of naturally-occurring hydrophilic colloids, such as proteins like casein, gluten, or zein modified by treating a solution of the same in aqueous alcohol with acrylic acid and hydrogen peroxide at an elevated temperature.

The incorporations of hydrosols in dispersions of hydrophilic colloids improves the properties thereof in most every case wherein a layer or coating of the hydrophilic colloid is to be employed. For instance, the hydrosol may be incorporated in an aqueous solution of a hydrophilic colloid in various proportions, those within the range of 10–90% of solids, based on the total solids in the resulting composition, being the most useful. For instance, if the hydrosol is in the form of an 8% suspension of the polymer, and gelatin or some other hydrophilic colloid is in the form of an 8% solution in water, the liquids may be mixed in equal amounts to prepare a 50–50 composition of hydrosol and gelatin or other hydrophilic colloid. Either or both of the constituents of the composition, in accordance with my invention, may be employed, either in more dilute or more concentrated solutions, these concentrations being at the option of the operator who prepares the same.

Compositions in accordance with my invention may be employed by coating out in any conventional procedure, depending upon the use to which the composition is put. For instance, if employed in a photographic emulsion, the composition is coated out in the conventional manner upon film base or baryta-coated paper to form a photosensitive product. In the use of compositions as described for subbing purposes, the film base is coated therewith under conditions whereby a very thin layer is formed on the film base. Where an antihalation backing layer is desired on the film base, the desired dye to give the antihalation effect is incorporated in the composition applied to the film base on the side opposite that to which the emulsion layer is applied, this application of antihalation layer being from a dilute aqueous composition in the conventional manner.

The following examples illustrate compositions prepared in accordance with my invention:

EXAMPLE 1

A hydrosol, prepared by the method described in U. S. Patent No. 2,739,137 of William F. Fowler, Jr., entitled "A Method for Making Polymeric Hydrosols," by emulsion polymerizing a mixture of 25% styrene, 59.5% butyl acrylate and 15.5% methacrylamide, using persulfate catalyst and sodium lauryl sulfate as the dispersing agent therein, was diluted to 8% solids concentration. Mixtures of different ratios of gelatin and latex were prepared by varying the proportions of this latex and an 8% solution of gelatin in water, the total volume in each case being 50 cc. There was also added to each of these compounds 0.25 cc. of 8% formaldehyde solution. The compositions thus prepared were coated out onto a film-forming surface and onto glass plates, the coatings in every case having a thickness of about .004 inch. The layers were dried for 2½ days under normal room conditions and were cured at 70° F. and 50% relative humidity for 24 hours. The resulting layers were stripped off of the film-forming surface and were tested, both for mechanical values and for clarity. The results obtained were as follows:

| Percent Hydrosol | Thickness (in thousandths of an inch) | Flexibility in Folds | Elong., Percent | Clarity |
|---|---|---|---|---|
| 0 | 4.0 | 12 | 5 | good. |
| 10 | 4.05 | 20 | 6 | good. |
| 20 | 4.25 | 23 | 7 | good. |
| 30 | 3.9 | 27 | 9 | good. |
| 40 | 4.0 | 21 | 9 | good. |
| 50 | 4.0 | 30 | 9 | good. |
| 60 | 4.2 | 31 | 11 | good. |
| 70 | 4.2 | 37 | 15 | good. |
| 80 | 4.5 | 114 | 26 | good. |
| 90 | 4.2 | 7,500 | 71 | good. |

EXAMPLE 2

A hydrosol of styrene-butylacrylate-methacrylamide polymer was prepared in the same manner and using the same ratios as in Example 1. A casein solution was prepared by soaking 10 grams of casein in 100 cc. of cold water for 15 minutes, adding 0.8 cc. of 28% aqueous ammonia and heating for 20 minutes at 50° C. Upon cooling, the casein solution resulting was mixed with the hydrosol in varying ratios, and coatings were prepared therefrom. These coatings were clear and smooth. The flexibilities obtained in the various cases were as follows:

| Percent Hydrosol Solid to Total Solid | Flexibility in Folds |
|---|---|
| (a) 0 (control) | <1 |
| (b) 25 percent | 31 |
| (c) 50 percent | >300 |
| (d) 75 percent | >300 |

EXAMPLE 3

10 grams of wheat protein were dissolved in 86 grams of water containing 4 grams of concentrated ammonium hydroxide. A hydrosol was prepared in the same manner as described in Example 1, and the wheat protein solution was mixed therewith in varying ratios, and the various compositions thus prepared were coated out as layers. It was found that, as the proportion of the hydrosol increased, the flexibility thereof was more pronounced. The coatings obtained with these compositions were clear and smooth.

EXAMPLE 4

A solution was prepared of 2.5 grams of zein, which had been modified by treating an aqueous alcohol solution thereof with acrylic acid and hydrogen peroxide at an elevated temperature (80–120° C.), by dissolving the zein so modified in 15 cc. of water containing 5 cc. of concentrated ammonia. The solution was mixed in various ratios with a hydrosol as specified in Example 1, and layers were coated from these various compositions. When dry, all the layers were clear, and it was found that as the proportion of hydrosol increased, the flexibilities of the layer which were obtained increased.

The following 3 examples illustrate the use of compositions in accordance with my invention for antihalation coatings onto film base:

EXAMPLE 5

A composition was prepared consisting of 31.8 grams of pigskin gelatin, 68.2 grams of styrene-butylacrylate-methacrylamide polymer hydrosol having 20% solids, 3 cc. of soap bark extract solution, 3.9 cc. of 2.64% aqueous mucochloric acid, 5.8 cc. of 5.40% aqueous chrome alum, 3.9 cc. of 6.6% aqueous solution of the dye bis[1-(p-sulfophenyl)-3-methyl-5-pyrazolone-(4)] - methineoxonol, 3.3 cc. of a 3.3% aqueous solution of the dye bis[1-p-sulfophenyl)-3-methyl-5-pyrazolone - (4)]trimethinoxonol, and 4.9 cc. of a 6.6% aqueous solution of the dye bis - [3-methyl-1-p-sulfophenyl-5-pyrazolone - (4)]pentamethinoxonol. Distilled water was added until the mass had a total weight of 545 grams. The pH of the mass was then adjusted to within 5.9–6.1 and was coated onto a cellulose acetate base at the rate of 5 lbs. per thousand square feet, whereby an antihalation-backed cellulose acetate base was obtained.

EXAMPLE 6

A composition was prepared consisting of 22.7 grams pigskin gelatin 114.0 grams of a styrene-butyl acrylate-methacrylamide polymer hydrosol having 20% solids, 3.0 cc. soap bark extract solution, 2.8 cc. of 2.64% aqueous mucochloric acid, 4.2 cc. of 5.40% aqueous chrome alum, 3.9 cc. of a 6.6% aqueous solution of the dye bis[1-(p-sulfophenyl)-3-methyl-5-pyrazolone - (4)] - methineoxonol, 3.3 cc. of a 3.3% aqueous solution of the dye bis [1-(p-sulfophenyl)-3-methyl-5-pyrazolone-(4)] - trimethinoxonol, and 4.9 cc. of a 6.6% aqueous solution of the dye bis-[3-methyl-1-p-sulfophenyl-5-pyrazolone-(4)]-pentamethinoxonol. Distilled water was added until the mass had a total weight of 545 grams. The pH of the mass was then adjusted to within 5.9–6.2 and was coated onto a cellulose acetate base at the rate of 5 lbs. per thousand square feet, whereby an antihalation-backed cellulose acetate base was obtained.

EXAMPLE 7

A composition was prepared consisting of 20.0 grams pigskin gelatin, 223.0 grams of a styrene-butyl acrylate-methacrylamide polymer hydrosol having 20% solids, 4.7 cc. soap bark extract solution, 1.7 cc. of 2.64% aqueous mucochloric acid, 2.5 cc. of 5.40% aqueous chrome alum, 6.1 cc. of a 6.6% aqueous solution of the dye bis-[1-p-sulfophenyl)-3-methyl-5-pyrazolone-(4)] -methineoxonol, 5.2 cc. of a 3.3% aqueous solution of the dye bis[1-(p-sulfophenyl-3-methyl-5-pyrazolone-(4)] -trimethinoxonol, and 7.8 cc. of a 6.6% aqueous solution of the dye bis-[3-methyl-1-p-sulfophenyl-5-pyrazolone-(4)] -pentamethinoxonol. Distilled water was added until the mass had a total weight of 545 grams. The pH of the mass was then adjusted to within 5.9–6.2 and was coated onto a cellulose acetate base at the rate of 5 lbs. per hundred square feet, whereby an antihalation-backed cellulose acetate base was obtained.

Compositions prepared in accordance with my invention may be employed, particularly in the photographic art, in most every application in which gelatin has been employed up to now. For instance, in the case of photographic film, compositions in accordance with my invention may be employed as subbing layers, as pelloid coatings, for antihalation backings (dye added), as the protective colloid for the silver halide in photographic emulsions, either black and white or colored, or as an overcoat to protect the film. In the case of photographic paper, compositions in accordance with my invention may be employed for sizing the paper, either by applying to the paper as a tub size or by introducing into the beater. In the baryta coating of paper, compositions in accordance with my invention may either be used as the preliminary coating, as the binder for the barium sulfate in the baryta coating itself, or as an overcoat layer to be applied after the application of the barium sulfate, or these compositions may be employed in all these connections. Also, compositions in accordance with my invention may be employed as the protective colloid for the silver halide or other sensitizing material in the sensitized emulsions which are used. The compositions of my invention are suitable for use in any case where gelatin has been previously employed in layers or coatings, and are particularly desirable where cracking, which often characterizes gelatin coatings of substantial thickness, has been detrimental to the use of gelatin itself.

One characteristic of photographic emulsions in which a composition in accordance with my invention is used as the protective colloid for the silver halide is that the absorption characteristics of the emulsion for yellow and magenta dyes, useful in color photography, is improved over that of gelatin emulsions. This has been noted especially when the polymer constitutes 2–50% of its mixture with gelatin. The advantage of this absorption is evidenced in the development of color films in which a coupler and color developing agent is used. For instance, where a color film is developed in a developing solution containing N-diethyl-p-phenylenediamine and ω-benzoylacet-(p-toluenesulfonamide)-anilide, the absorption of color increases over that which is obtained where only gelatin is employed as the protective carrier for the silver halide, this combination imparting a yellow coloration to the photographic emulsion. If a photographic emulsion having a protective carrier for the silver halide of a composition in accordance with my invention is developed in a developing composition comprising 2-amino-5-diethylaminotoluene hydrochloride and 1-(2'-quinolyl)-3-benzamido-5-pyrazolone, the intensity of coloration (magenta) of the photographic emulsion is greater than in the case of emulsions where gelatin alone is employed as the carrier for the silver halide therein. Also, compositions in accordance with my invention may be colored by imparting directly thereto a color by means of the addition of a dye to the mixture of latex and hydrophilic colloid. By coating out this composition in a thin layer upon a transparent support, such as glass or cellulose ester sheeting, a color filter may be obtained.

The following examples illustrate the use of mixtures, in accordance with my invention, as the carrier for silver halide in photographic emulsions.

EXAMPLE 8

Silver halide was prepared by running Solution A into Solution B in approximately 2 minutes, these solutions being as follows:

*Solution A*

56 grams of gelatin
141.4 grams of potassium bromide
1.28 grams of potassium iodide, dissolved in 1460 ml. of distilled water at 60° C.

*Solution B*

170 grams silver nitrate dissolved in 2000 ml. distilled water at 60° C.

The resulting silver halide mass was cooled to 45° C., and there was then added thereto an aqueous dispersion consisting of 107.5 grams of gelatin and 537.5 cc. of a 20% solution of styrene-butylacrylate-methacrylamide polymer as a hydrosol in water. The mass was stirred for 30 minutes at 45° C. It was then set to a jelly by chilling overnight, shredded into noodles and washed in cold running water for 60 minutes. After draining, the noodles were melted at 45° C., and there was then added 26 cc. of methyl alcohol containing 0.2% thymol, a mixture of 19.25 grams of gelatin and 96.25 cc. of a 20% hydrosol of the above-mentioned polymer in water, and distilled water to make a total volume of the emulsion mass of 4200 cc. The pH was then adjusted to 6.5, 2.5 cc. of 0.36 normal potassium bromide was added, and the whole was stirred at 40° C. A 200 cc. portion was taken, heated for 60 minutes at 56° C., cooled to 40°, and 2 cc. of 7.5% solution of saponin in water was mixed therewith, and the emulsion was coated onto a cellulose acetate film base. After drying, the photographic film thus obtained was exposed in a sensitometer, processed for 3 minutes in a developer and tested. The emulsion obtained had a 10/i speed of 7.3, a contrast of 2.46 and a fog value of .04.

EXAMPLE 9

A silver halide dispersion was prepared by running Solution A into agitated Solution B over a period of approximately 20 minutes. Solution A consisted of 56 grams of gelatin, 141.4 grams of KBr and 1.28 grams of KI, dissolved in 1460 ml. of distilled water at 60° C. Solution B consisted of 170 grams of silver nitrate dissolved in 2000 ml. of distilled water at 60° C. The silver halide dispersion was cooled to 40° C., and there was then added a mixture of 79.5 grams of gelatin and 677.5 cc. of a 20% hydrosol of styrene-butylacrylate-methacrylamide polymer in water prepared as described in Fowler Patent No. 2,739,137. The mass was stirred for 30 minutes at 40° C. It was then set to a jelly by chilling overnight, sliced into noodles, washed 60 minutes in cold running water and drained. The noodles were melted at 40° C., and there was then added to the mass 26 cc. of methyl alcohol containing 0.2% of thymol, a mixture of 19.25 grams of gelatin and 96.25 cc. of polymer hydrosol, of the same type as used previously, and distilled water to bring the mass to a total volume of 4200 cc. The pH was adjusted to 6.5, and the mass was stirred while maintaining a temperature of 40° C. A 200 cc. portion thereof was taken and heated 40 minutes at 56° C., whereupon it was cooled to 40°. 2 cc. of a 7.5% solution of saponin in water was added, and the emulsion was coated onto a cellulose acetate film base. After drying, a sample of the film was exposed on a sensitometer and processed for 3 minutes in a conventional developer. The resulting product was found to have a 10/i speed of 76, a contrast of 1.25 and a fog value of .05.

It is to be understood that by the term "naturally-occurring hydrophilic colloids," as referred to herein, included therein are modified forms of those materials, as well as the materials themselves. For instance, proteins may be subjected to treatment with an agent which modifies the material to impart additional properties thereto over those which the protein already possesses. For instance, as the naturally-occurring colloid in compositions in accordance with my invention, a protein treated with acrylonitrile or methyl acrylate, as described in U. S. Patent No. 2,562,534 of Coffmann, might be employed. Another type of naturally-occurring hydrophilic colloid, in preparing compositions in accordance with my invention, is that described in Lowe and Gates Patent No. 2,691,582 resulting from the treatment of a protein, such as casein or soy protein, with hydrogen peroxide, or from subjecting a protein of this nature, which has been treated with acrylonitrile, to oxidation by means of hydrogen peroxide. These modified protein materials are compatible with the hydrosols such as have been described herein, and may be mixed therewith in proportions within the range set out for compositions in accordance with my invention.

I claim:

1. A composition useful for the preparation of flexible coatings which comprises a mixture of an aqueous dispersion of a proteinaceous hydrophilic colloid and a hydrosol obtained by the emulsion polymerization of a mixture of an amide of an acid selected from the group consisting of acrylic acid and methacrylic acid, an alkyl ester of an acid selected from the group consisting of acrylic acid and methacrylic acid and styrene.

2. A composition useful for the preparation of flexible coatings which comprises a mixture of an aqueous dispersion of gelatin and a hydrosol obtained by the emulsion polymerization of a mixture of an amide of an acid selected from the group consisting of acrylic acid and methacrylic acid, an alkyl ester of an acid selected from the group consisting of acrylic acid and methacrylic acid and styrene.

3. A composition useful for the preparation of flexible coatings which comprises a mixture of an aqueous dispersion of casein and a hydrosol obtained by the emulsion polymerization of a mixture of an amide of an acid selected from the group consisting of acrylic acid and methacrylic acid, an alkyl ester of an acid selected from the group consisting of acrylic acid and methacrylic acid and styrene.

4. A composition useful for the preparation of flexible coatings which comprises a mixture of an aqueous dispersion of zein modified by treatment with acrylic acid and hydrogen peroxide and a hydrosol obtained by the emulsion polymerization of a mixture of an amide of an acid selected from the group consisting of acrylic acid and methacrylic acid, an alkyl ester of an acid selected from the group consisting of acrylic acid and methacrylic acid and styrene.

5. A composition useful for the preparation of flexible coatings which comprises a mixture of an aqueous dispersion of a proteinaceous hydrophilic colloid and a hydrosol obtained by the emulsion polymerization of a mixture of methacrylamide, butyl acrylate and styrene.

6. A composition useful for the preparation of flexible coatings which comprises a mixture of an aqueous dispersion of gelatin and a hydrosol obtained by the emulsion polymerization of a mixture of methacrylamide, butyl acrylate and styrene.

7. A photographic emulsion composition which comprises silver halide and a colloid binder therefor comprising an aqueous dispersion of a proteinaceous hydrophilic colloid and a hydrosol obtained by the emulsion polymerization of a mixture of an amide of an acid selected from the group consisting of acrylic acid and methacrylic acid, an alkyl ester of an acid selected from the group consisting of acrylic acid and methacrylic acid and styrene.

8. A photographic emulsion composition which comprises silver halide and a colloid binder therefor comprising an aqueous dispersion of gelatin and a hydrosol obtained by the emulsion polymerization of a mixture of an amide of an acid selected from the group consisting of acrylic acid and methacrylic acid, an alkyl ester of an acid selected from the group consisting of acrylic acid and methacrylic acid and styrene.

9. A photographic emulsion composition which comprises silver halide and a colloid binder therefor comprising an aqueous dispersion of gelatin and a hydrosol obtained by the emulsion polymerization of a mixture of methacrylamide, butyl acrylate and styrene.

References Cited in the file of this patent

UNITED STATES PATENTS

| Number | Name | Date |
|---|---|---|
| 1,981,102 | Hagedorn et al. | Nov. 20, 1934 |
| 2,123,599 | Fikentscher et al. | July 12, 1938 |
| 2,140,048 | Fikentscher et al. | Dec. 13, 1938 |
| 2,311,059 | Lowe | Feb. 16, 1943 |
| 2,384,072 | Brubaker | Sept. 4, 1945 |
| 2,461,023 | Barnes et al. | Feb. 8, 1949 |
| 2,473,548 | Smith | June 21, 1949 |
| 2,498,792 | Cottet et al. | Feb. 28, 1950 |
| 2,514,328 | Jones | July 4, 1950 |
| 2,604,388 | Staehle | July 22, 1952 |
| 2,611,763 | Jones | Sept. 23, 1952 |
| 2,616,807 | Land | Nov. 4, 1952 |
| 2,739,137 | Fowler | Mar. 20, 1956 |